(12) United States Patent
Brehm et al.

(10) Patent No.: US 7,748,321 B2
(45) Date of Patent: Jul. 6, 2010

(54) METHOD FOR PRODUCING A HIGH-RESOLUTION SURFACE PATTERN

(75) Inventors: Ludwig Brehm, Adelsdorf (DE); Dieter Geim, Thalmässing (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 1212 days.

(21) Appl. No.: 10/564,506

(22) PCT Filed: Jul. 16, 2004

(86) PCT No.: PCT/DE2004/001554

§ 371 (c)(1),
(2), (4) Date: Jan. 12, 2006

(87) PCT Pub. No.: WO2005/009742

PCT Pub. Date: Feb. 3, 2005

(65) Prior Publication Data

US 2007/0095224 A1      May 3, 2007

(30) Foreign Application Priority Data

Jul. 21, 2003   (DE) ................................ 103 33 255

(51) Int. Cl.
*B41F 19/02* (2006.01)
(52) U.S. Cl. .................... 101/483; 101/150; 101/170; 101/401.1
(58) Field of Classification Search ........................ None
See application file for complete search history.

(56) References Cited

U.S. PATENT DOCUMENTS

| 4,715,623 | A | 12/1987 | Roule et al. |
| 5,538,753 | A | 7/1996 | Antes et al. |
| 5,714,213 | A | 2/1998 | Antes et al. |
| 5,759,420 | A | 6/1998 | Minnetian et al. |
| 6,176,522 | B1 | 1/2001 | Jackson |

FOREIGN PATENT DOCUMENTS

| CH | 670904 | 7/1989 |
| DE | 37 05 988 A1 | 10/1988 |
| DE | 195 44 099 A1 | 5/1997 |
| DE | 197 46 174 C1 | 7/1999 |
| EP | 0537439 | 4/1993 |
| EP | 0 687 771 A2 | 12/1995 |
| RU | 2150392 | 6/2000 |
| WO | WO 97/34170 | 9/1997 |
| WO | WO 00/13916 | 3/2000 |

*Primary Examiner*—Judy Nguyen
*Assistant Examiner*—Joshua D Zimmerman
(74) *Attorney, Agent, or Firm*—Hoffmann & Baron, LLP

(57) ABSTRACT

The invention concerns a process for producing a high-resolution surface pattern on a substrate and a multi-layer body produced by means of that process and an apparatus for carrying out the process. A printing substance is applied in pattern form to the substrate by means of a printing process. For fine structuring of the surface pattern, prior to application of the printing substance, a microscopic surface structure with a plurality of grooves is replicated into the surface of the substrate. The fine structuring of the surface pattern is determined by the respective locally applied application amount of printing substance and the respective local relief parameters of the microscopic surface structure in particular orientation direction and profile shape.

16 Claims, 9 Drawing Sheets

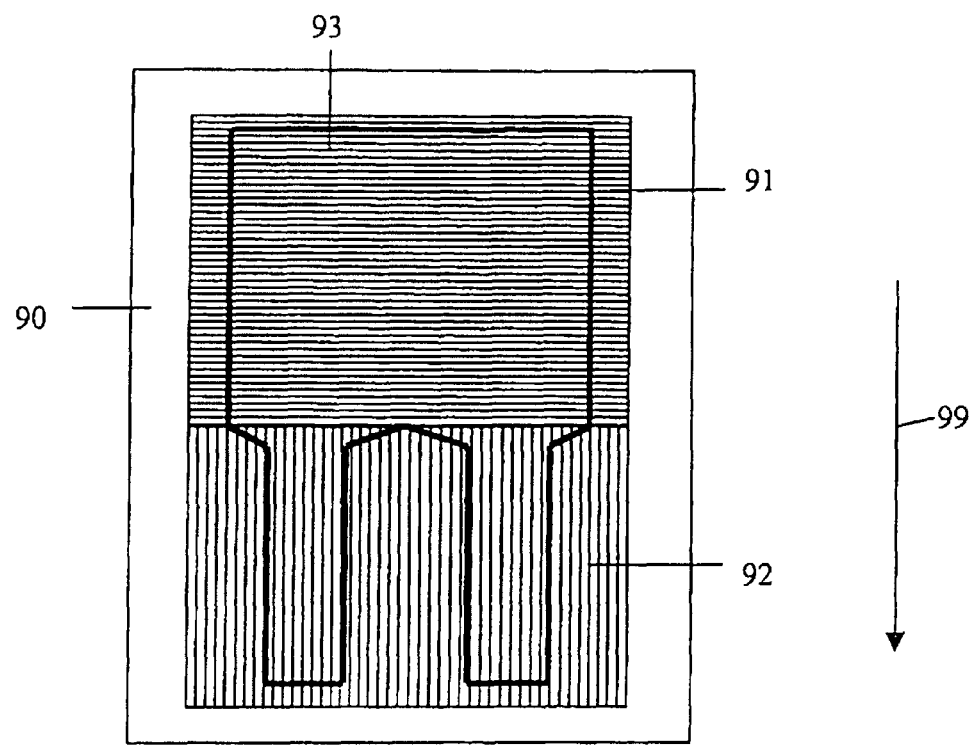
Fig. 9a
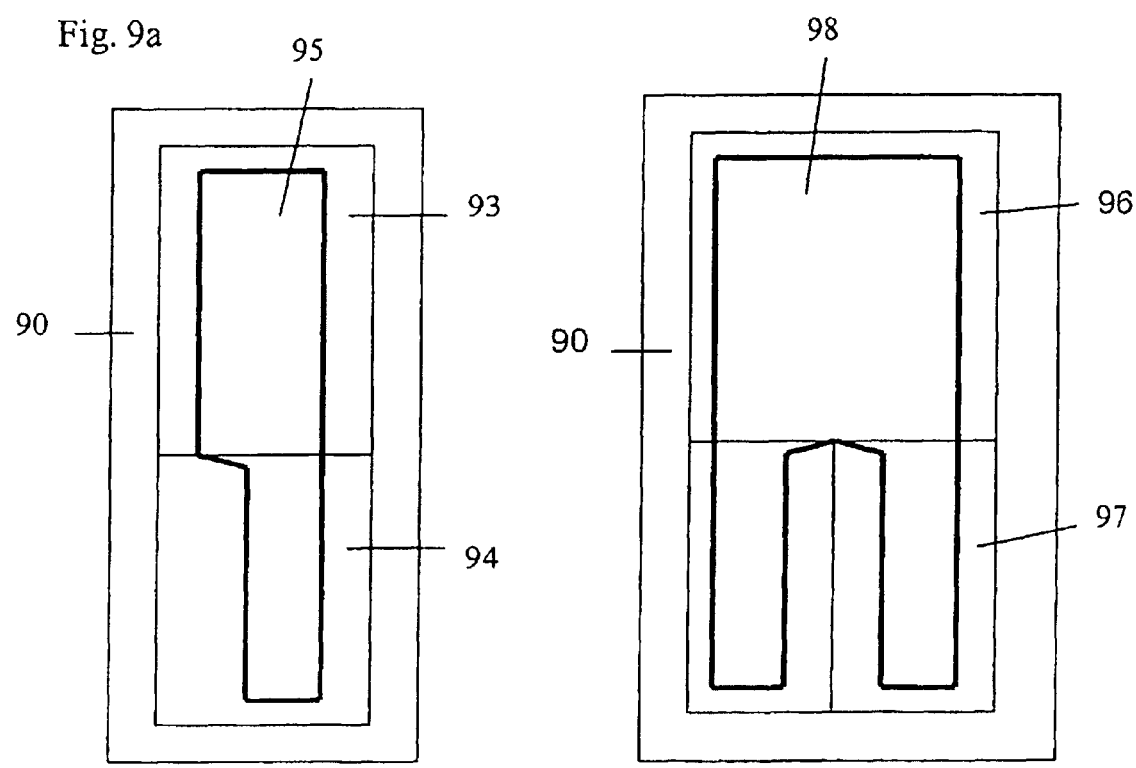
Fig. 9b
Fig. 9c

METHOD FOR PRODUCING A HIGH-RESOLUTION SURFACE PATTERN

CROSS-REFERENCE TO RELATED APPLICATIONS

This application is a National Phase application of International Application No. PCT/DE2004/001554 filed Jul. 16, 2004, which claims priority based on German Patent Application No. 103 33 255.3, filed Jul. 21, 2003, which are incorporated herein by reference.

BACKGROUND OF THE INVENTION

The invention concerns a process for producing a high-resolution surface pattern on a substrate, wherein, in the process, a printing substance is applied to the substrate in pattern form by means of a printing process. The invention further concerns a multi-layer body with a pattern layer applied to a substrate layer in pattern form by means of a printing process, and an apparatus for producing a high-resolution surface pattern which includes a printing station for applying a viscous printing substance to a substrate in pattern form.

Intaglio, offset, relief and screen printing processes are usually employed for applying a printing substance to a substrate.

Intaglio printing denotes a printing process using printing elements which are recessed with respect to the surface of the printing form. After complete inking of the printing form the surface is freed of the printing ink so that the ink only remains behind in the recessed locations. The nature of the inking operation and the operation of wiping the surface clear of ink do not permit pure printing over an area so that entire drawings are resolved into lines, dots and picture elements. Because of the differing depth and size of the individual printing elements they accommodate more or less printing ink and consequently the print produced involves different colouring power at the various locations in the image.

In order to improve the resolution of those printing processes DE 37 05 988 A1 proposes using as the printing form a homogeneous sheet or film into which items of printing information are introduced by means of very fine perforating processes, in the form of capillaries, as printing passages. A low-viscosity printing substance is introduced into the capillaries and the printing substance is applied to the article or material to be printed upon from the capillaries with a defined pressing force, in the form of very fine print. In that respect, focused laser beams of a beam diameter of 1 to 10 μm are used for producing the very fine perforations. The printing form employed is a homogeneous film or sheet which is 20 to 50 μm in thickness, for example a plastic or metal film or sheet.

DE 195 44 099 A1 proposes using a transparent cylinder as the ink or printing carrier, the cylinder being provided with cups which bear directly against each other. The cups are filled with molten ink and then the ink is put into a solid condition by thermal effect.

DE 197 46 174 C1 proposes a procedure in which a fluid, meniscus-forming printing substance is continuously introduced into cups and the printing substance in the cups is transferred by means of a process induced by an energy-producing device, on an item or material to be printed upon, which is moved towards the cups.

Accordingly, in the above-described known processes for improving the resolution which can be achieved by means of a printing process, the attempt is made to improve the level of resolution which can be achieved by applying, with the highest possible degree of spot accuracy, a minimum possible amount of printing substance.

SUMMARY OF THE INVENTION

Now, the object of the present invention is to permit improved production of a surface pattern with a high level of resolution.

That object is attained by a process for producing a high-resolution surface pattern on a substance, wherein a printing substance is applied to the substrate in pattern form by means of a printing process, wherein for fine structuring of the surface pattern prior to the application of the printing substance a microscopic surface structure with a plurality of grooves is replicated in the surface of the substrate and wherein the fine structuring of the surface pattern is determined by the respective locally applied application amount of printing substance and the respective local relief parameters of the microscopic surface structure, in particular orientation direction and profile shape.

The object of the invention is further attained by an apparatus for producing a high-resolution surface pattern on a substrate, which further has a printing station for applying a printing substance to the substrate in pattern form, which further has a replication station arranged upstream of the printing station for fine structuring of the surface pattern, which replicates into the surface of the substrate a microscopic surface structure having a plurality of grooves, and in which the printing station applies the printing substance to the microscopic surface structure of the substrate in such a way that a predetermined fine structuring of the surface pattern is afforded by the respective locally applied application amount of printing substance and the respective local relief parameters of the microscopic surface structure, in particular orientation direction and profile shape.

The object of the invention is further attained by a multi-layer body having a substrate layer and a pattern layer of a printing substance, which is arranged on the substrate layer in the form of a high-resolution surface pattern, wherein a microscopic surface structure with a plurality of grooves is replicated into the surface of the substrate for fine structuring of the surface pattern prior to application of the printing substance and the fine structuring of the surface pattern is determined by the respective locally applied application amount of printing substance and the respective local relief parameters of the microscopic surface structure, in particular orientation direction, profile depth and profile shape.

Accordingly the invention provides for an improvement in the resolution of the printed image produced, by specific targeted influencing of the surface structure of the substrate. The precise form of the surface pattern is afforded by the superimposition of three effects, on the one hand the respective locally applied application amount of a printing substance, the rheological properties of the printing substance, and on the other hand the respective local relief parameters of the microscopic surface structure.

The invention makes it possible to achieve levels of resolution which cannot be produced with conventional printing procedures. Thus for example levels of resolution in the region of about 80 μm can be achieved by conventional intaglio printing processes. When using the invention, it is possible here to improve the level of resolution which can be achieved by means of an intaglio printing process, to about 30 μm and less. Further advantages are afforded by virtue of the fact that wide-spread and matured printing technologies can be used for carrying the invention into effect. That affords considerable cost advantages.

Advantageous configurations of the invention are set forth in the appendant claims.

It is particularly advantageous in that respect to use a printing substance with a pre-defined viscosity and affinity. The viscosity of the printing substance and the affinity between the printing substance and the substrate influence the flow characteristics of the printing substance. That means that the resulting printed image is also influenced by those parameters. It is particularly advantageous in that respect to select a printing substance of a viscosity of 50-150 mPas. In addition it is possible for the level of printing resolution to be further influenced by a specific choice in respect of the surface tension of the printing substance and the printing substrate (affinity). When selecting a printing substance whose viscosity is preferably in that range of values, the above-described effects are particularly relevant so that it is possible to produce a printed image of particularly high resolution.

The invention is particularly suitable for applying high-resolution surface patterns to a multi-layer film body. Thus the invention can be used in particular in the production of hot stamping films, lamination films or transfer films. Those films and also film elements produced from such films can be used in the security sector, for example as optical security elements for safeguarding banknotes, credit cards, identity papers and the like. In addition films or film elements of that kind can also be used in the decorative area.

The use of the invention has proven to be particularly advantageous in the region of demetallisation/partial removal of substrate layers. The high level of resolution which can be achieved by the invention and the high quality standard which can be attained are of great advantage here. By means of the invention for example an etching resist, an etching agent or a washing mask can be applied in accordance with a high-resolution surface pattern, to a substrate layer which is to be partially removed. A further advantageous use involves applying organic semiconductor material by means of the invention, as a printing substance, in the form of a high-resolution surface pattern on a substrate layer, in order for example to produce organic field effect transistors (OFETs).

In accordance with a preferred embodiment of the invention the fine structuring of the surface pattern is implemented by a variation in the orientation direction of the grooves of the microscopic surface structure. Here, the width of a surface region of a surface pattern is determined by the choice of the angle between the longitudinal axis of the surface region and the orientation direction of the associated portion of the microscopic surface structure. Thus, the width of the surface region can be varied by providing regions involving a different orientation of the surface structure, in the surface region. In this case, that method can be particularly easily implemented from the technical point of view and is especially effective. A micro-fine printing substance applied locally to the microscopic surface structure, for example in the form of a drop, is influenced in its configuration by the microscopic surface structure. The rheological properties of the printing substance also exert an influence on the fine structuring. The asymmetric configuration of the printing substance, which is produced by the microscopic surface structure, is utilised specifically to enhance the level of resolution of the surface pattern.

A particularly large variation in the width of the surface region of the surface pattern can be achieved in that case by the provision, in the surface region, of at least two regions in which the orientation directions of the surface structure are turned relative to each other through 90 degrees.

It is further possible to produce the fine structuring of the pattern by a variation in the profile depth of the grooves of the microscopic surface structure. Likewise, fine structuring of the surface pattern can be effected by a variation in the profile shape of the grooves of the microscopic surface structure. Varying the profile depth and the profile shape makes it possible to vary the wetting area occupied by a locally applied micro-fine printing substance drop. In that way, it is possible to indirectly vary the width of a surface region of the surface pattern, by providing, in the surface region, regions involving different profile shapes or different profile depths in the surface structure. In addition, centering of a surface region of the surface pattern can be altered by asymmetrical profile shapes in the associated portion of the microscopic surface structure. Asymmetrical profile shapes of that kind provide for an asymmetrical configuration of the micro-fine printing substance drop applied to the microscopic surface structure. That effect is used specifically to provide a further increase in the level of resolution of the surface pattern.

It is possible to produce the fine structuring of the surface pattern both by a variation in the orientation direction of the grooves of the microscopic surface structure, by varying the profile depth of the microscopic surface structure, and by varying the profile shapes of the grooves of the microscopic surface structure. The rheological properties of the printing substance also exert an influence on the fine structuring. In that way, the desired, high-resolution pattern can be produced by a combination of the above-described effects.

The above-described effects are particularly relevant in that respect if the width of the surface regions is less than 50 μm.

It is particularly advantageous to produce moiré patterns by means of the fine structuring of adjacent surfaces, by a variation in local relief parameters of the microscopic surface structure. Moiré patterns produced in that way cannot be replicated by means of conventional printing processes and therefore can be used as a high-grade optical security feature. Those advantages are also enjoyed in the production of a micro-script pattern by means of the fine structuring by virtue of a variation in local relief parameters of the microscopic surface structure. This also affords an optical security feature which can only be copied with difficulty.

It is further possible to produce a region in which the printing substance layer is of a thickness which varies in a predetermined manner, by virtue of a variation in the profile depth of the grooves of the microscopic surface structure. That can be utilised to produce lens bodies: a high-refractive lacquer is used as the printing substance. The variation in the profile depth of the grooves of the microscopic surface structure provides that a lens body is produced when applying the high-refractive lacquer in that region.

The high-resolution, surface-covering pattern can be particularly easily produced if the fine structuring of the surface pattern is produced by a variation in the relief parameters of the microscopic surface structure, with a substantially constant application amount of printing substance per unit of surface area. That reduces the computing expenditure which is required to determine the necessary microscopic surface structure and the necessary pattern, in accordance with which the printing substance is to be applied to the substrate in order to achieve the predetermined high-resolution surface pattern.

Particularly good results are achieved if the microscopic surface pattern has a spatial frequency of more than 50 grooves/mm, preferably from 100 to 1200 grooves/mm, and a profile depth of less than 2 μm, preferably from 0.2 to 1.2 μm.

An apparatus for producing a surface pattern according to the invention preferably has a printing station with an insetting device in order to ensure application of the printing substance to the microscopic surface structure in accurate register relationship. Particularly good results can be achieved if the apparatus has a central cylinder on which the replication station and the printing station are arranged. That provides for a print in accurate register relationship, so that the level of resolution of the surface pattern is further improved.

BRIEF DESCRIPTION OF THE DRAWINGS

The invention is described in greater detail by way of example hereinafter by means of a number of embodiments with reference to the accompanying drawings.

FIGS. 9a to 9c show views of multi-layer bodies according to the invention for further embodiments of the invention.

DETAILED DESCRIPTION OF THE INVENTION

The procedure of the process of the invention is described hereinafter with reference to FIGS. 1 and 2a to 2e.

Figure 1:
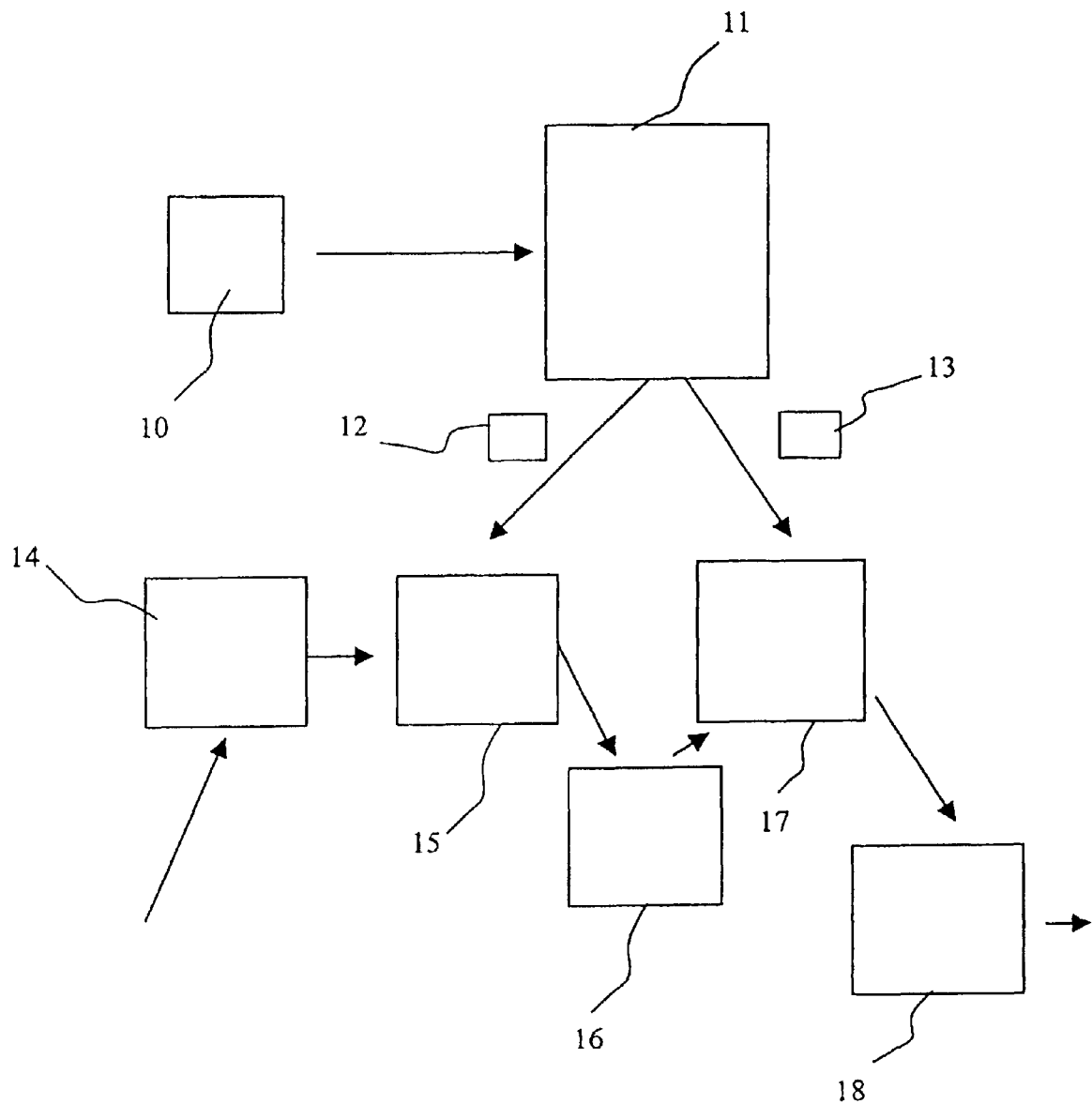
FIG. 1 shows a flow chart, showing the procedure involved in the process according to the invention.

FIG. 1 shows a plurality of processing stations 14, 15, 16, 17 and 18 and a computing station 11.

The processing stations 14, 15, 16, 17 and 18 perform process steps, by means of which a layer in pattern form shaped in accordance with a surface pattern 10 is produced from a reflecting material on a base film. The computing unit 11 generates from the present surface pattern 10 a specification of a microscopic surface pattern 12 and an associated surface pattern 13. The surface pattern 13 describes the form in which a printing substance has to be applied in the form of a pattern to a substrate, in the surface of which the microscopic surface structure 12 is replicated, in order ultimately to achieve an application of printing substance, in accordance with the surface pattern 10. As described in further detail hereinafter, in this case the fine structuring of the surface pattern 10 is afforded by the respective application amount of printing substance which is applied locally in accordance with the surface pattern 13, and the respective local relief parameters of the microscopic surface structure 12.

Figure 2A:
FIGS. 2a to 2e show diagrammatic views of a multi-layer body which is processed in accordance with the process of the invention.
Figure 2:
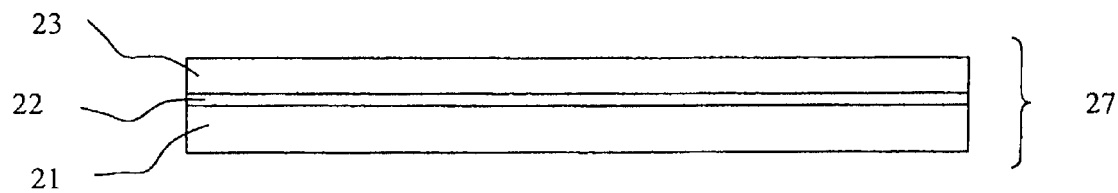
Figure 2:
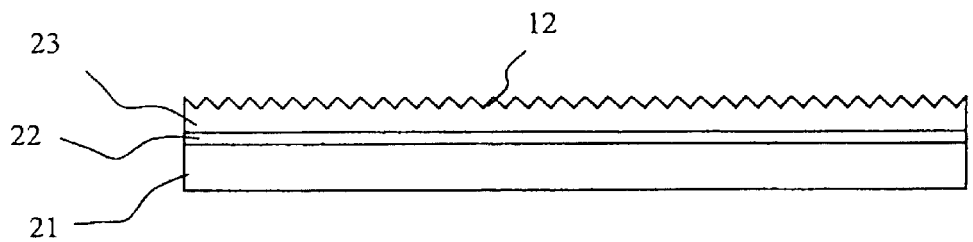
Figure 2:
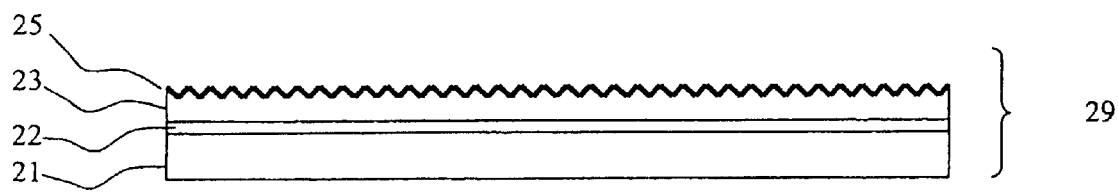

The film body shown in FIG. 2a is fed to the processing station 14. That film body comprises a carrier or backing layer 21 and a release and/or protective lacquer layer 22 which is applied to the carrier film 21 in a process step which is not shown here. The carrier film 21 is for example a polyester film of a thickness of from about 12 μm to 50 μm. The release and/or protective lacquer layer 22 is approximately from 0.3 to 1.2 μm in thickness. It would also be possible to eliminate that layer.

The processing station 14 now applies a replication layer 23 to the film body supplied thereto. In this case the replication layer 23 preferably comprises a transparent thermoplastic material which is applied to the supplied film body over the full surface thereof, for example, by means of a printing process.

In that respect, the replication lacquer is for example of the following composition:

| Parts by weight of the components | |
|---|---|
| High-molecular PMMA resin | 2000 |
| Silicone alkyd oil-free | 300 |
| Non-ionic wetting agent | 50 |
| Low-viscosity nitrocellulose | 750 |
| Methylethylketone | 1200 |
| Toluene | 2000 |
| Diacetone alcohol | 2500 |

The operation of applying the replication layer is effected for example with a line grid raster intaglio printing roller with an application weight of 2.2 g/m² after drying. The drying operation is effected in the drying passage at a temperature of 100 to 120 degrees Celsius.

The film body 27 formed in that way (FIG. 2b) is now fed to the processing station 15.

The processing station 15 is a replication station which replicates the microscopic surface structure 12 into the replication layer 23.

Replication can be effected in this case by means of an embossing stamping tool. It is however also possible for the replication operation to be implemented by means of a UV replication process, as will be described by way of example hereinafter with reference to FIG. 3.

Thus for example the microscopic surface structure 12 is embossed into the replication layer 23 for example at about 160 degrees Celsius by means of a die consisting of nickel. For the purposes of embossing the microscopic relief structure 12, the die is preferably electrically heated. Before the die is lifted off the replication layer 23 after the embossing operation the die can be cooled down again. After embossing of the microscopic surface structure 12 the replication lacquer hardens by cross-linking or in some other fashion.

FIG. 2c now shows the multi-layer body 27 after processing by the processing station 15. As shown in FIG. 2c the microscopic surface structure 12 is now produced by shaping in the surface of the replication layer 23. The film body which is processed in that way can now be fed to the processing station 16.

The processing station 16 coats the film body which is fed thereto, with a thin reflection layer 25. The reflection layer 25 is preferably a thin, vapour-deposited metal layer or an HRI layer (HRI=High Refraction Index). The materials that can be used for the metal layer are essentially chromium, aluminium, copper, iron, nickel, silver, gold or an alloy with those materials.

It is also possible to eliminate the reflection layer 25. The reflection layer 25 is preferably applied when the following layers include for example partial metallisation, for example by application of a resist lacquer and an etching step. The operation of applying the reflection layer 25 can be omitted in particular when conductive polymers are being printed on. In that case the replication layer comprises a hardened resin (for example UV-cross-linkable resin, 2K-lacquer) which is no longer dissolved by application of the conductive polymer, so that there is no interaction between the replicated lacquer system and the printed system.

FIG. 2d now shows a film body 29 after processing at the processing station 16. Besides the carrier layer 21, the release and/or protective lacquer layer 22 and the replication layer 23 the film body 29 has a reflection layer 25 which is produced by vapour deposition over the full surface area thereof. The film body 29 is now fed to the processing station 17. By means of a printing process, the processing station 17 applies to the film body 29 a printing substance of suitable viscosity and affinity, in the form of a pattern in accordance with the surface pattern 13. The printing process used at the processing station 17 is preferably an intaglio printing process. Thus the printing substance 26 is applied by printing for example using an intaglio printing grid roller having a plurality of cups which provide for an application of ink in accordance with the surface pattern 13.

It is also possible here however for the operation of applying the viscous printing substance 26 to be effected by means of another printing process, for example by means of an offset, relief, screen printing or flexoprinting process.

Figure 2E:
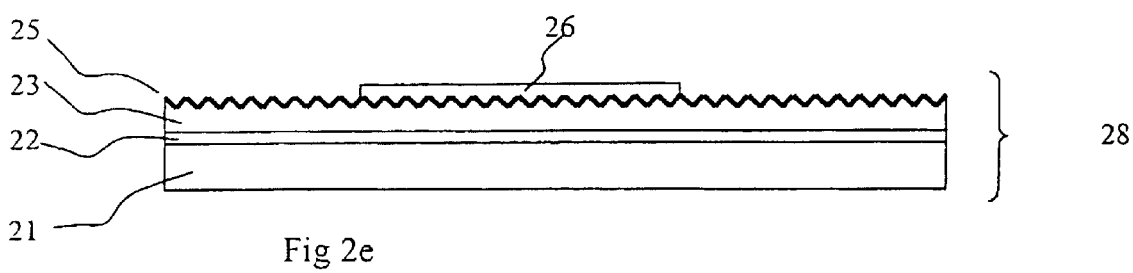

FIG. 2e now shows a film body 28 after processing at the processing station 17. As shown in FIG. 2e the surface of the film body 29 is covered in region-wise manner by the printing substance 26. The coverage region which is occupied by the printing substance 26 does not in this case correspond to the application region in which the printing substance is applied to the surface of the film body 29 by the processing station 17. Rather, the coverage region is determined by the respective locally applied application amount of printing substance and the respective local relief parameters of the microscopic surface structure 12 which, as shown in FIG. 2d or FIG. 2e, is also shaped in the surface of the reflection layer 25 after the application of the reflection layer 25.

The printing substance 26 is an etching resist, preferably based on vinyl chloride/vinyl acetate copolymer.

The film body 28 is now fed to the processing station 18. The processing station 18 is a demetallisation station which removes the regions of the reflection layer 25, which are not covered by replication lacquer, by means of acid or lye.

After passing through the processing station 18, the film body 28 can also pass through further washing, drying and coating stations. Thus it is then also possible for example for still further decorative and/or adhesive layers to be subsequently applied to the film body 28. It will be appreciated moreover that it is also possible, prior to the application of the replication layer 23, to apply still further layers to the film body formed by the layers 21 and 22, so that the film body 28 can be used for example as part of a thermal transfer film, a stamping or embossing film or a laminating film with purely optical or functional elements.

It is also possible for the processing station 17, instead of an etching resist, to apply an etching agent to the reflection layer 25, as the printing substance. Furthermore, it is also possible for the coating operation with the reflection layer 25 to be effected not prior to the operation of applying the printing substance 26, but only after the printing substance 26 has been applied. Thus, the printing substance 26 can for example form a washing mask which, after coating over the entire surface area involved, permits partial removal of the reflection layer 25 by a washing operation.

In accordance with a further embodiment of the invention, the processing stations 16 and 18 are eliminated so that the installation shown in FIG. 1 now produces a high-resolution decorative layer which is configured in accordance with the surface pattern 10, on a film body. Here, the printing substance used is a conventional printing ink which for example comprises a solvent with from 2 to 25% solids.

It is further possible for the printing substance applied to be polymers, by means of which organic semiconductor circuits are produced. Thus for example the printing substance used may be organic electrode materials such as polyaniline or polypyrrole, organic semiconductor materials such as polythiophene or insulators such as polyphenylphenol. It is possible to produce for example organic field effect transistors (OFETs) by printing on one or more functional polymer layers of that nature.

It will be appreciated that it is essential in that respect that, when printing on the functional polymer layer or layers, attention is paid to any effects and repercussions of a subjacent metallic and thus conducting reflection layer. A metallic reflection layer of that kind is thus to be of such a configuration that it does not influence the electrical interactions of the functional polymer layers (for example a short-circuit) or involve a function in the electrical circuit produced by the functional polymer layers.

Figure 3:
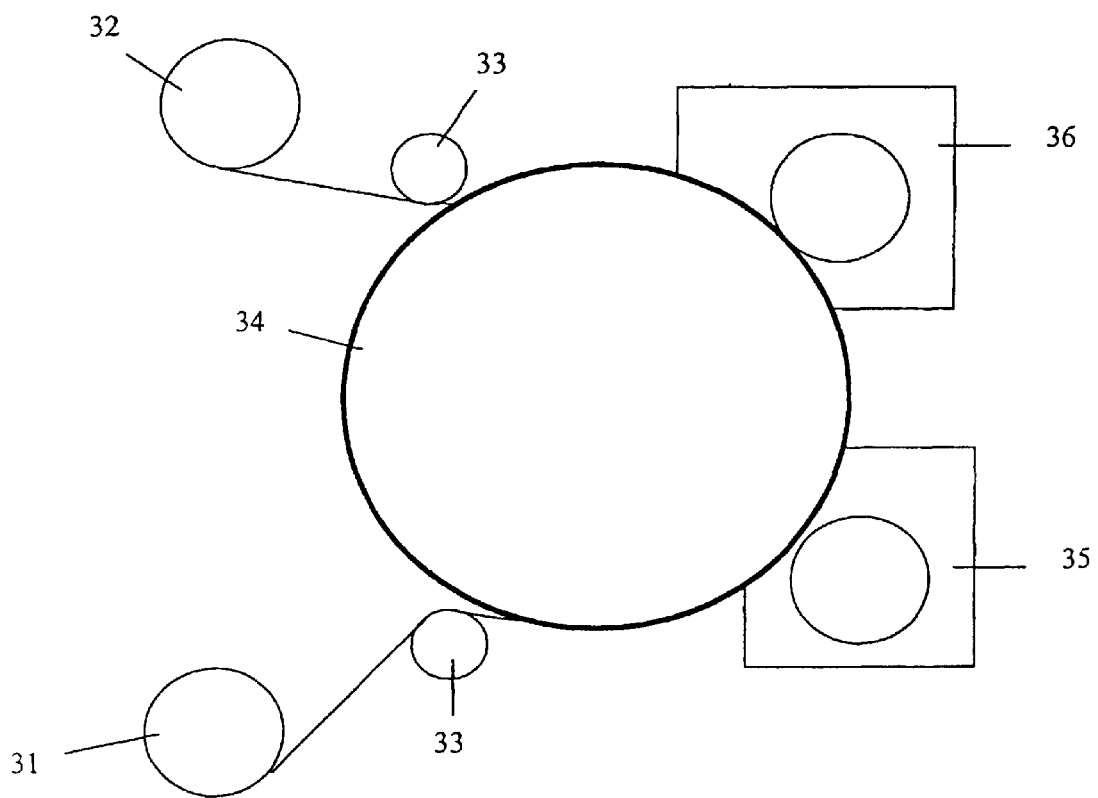
FIG. 3 shows a diagrammatic view of an apparatus for producing a surface pattern according to the invention.

FIG. 3 shows a further embodiment of an apparatus for producing the surface pattern 10.

FIG. 3 shows a central cylinder 34, two rolls 31 and 32, a replication station 35, a printing station 36 and two guide rollers 33.

The web of film is passed from the roll 31 by way of the central cylinder 34 to the roll 32. In this case the web of film preferably comprises a multi-layer body which has at least a carrier layer, for example comprising a 19 μm thick PET film, and a replication layer applied thereto. It will be appreciated that it is also possible for that multi-layer body to also include a plurality of further layers.

As already described hereinbefore with reference to FIG. 1, the replication station 35 replicates the microscopic surface structure 12 into the replication layer of the web of film, by means of an embossing stamping tool.

Further advantages can be achieved here if, instead of the replication process described with reference to FIG. 1, an UV-replication process is employed by the replication station 35. For that purpose it is advantageous to arrange at the central cylinder 34 upstream of the replication station 35 a coating station which applies an UV-replication lacquer to the web of film which is supplied from the roll 31. The replication station 35 includes a mask cylinder which dips into the still fluid UV-replication lacquer and hardens the UV-replication lacquer in accordance with the surface pattern 12, by irradiation of the UV-replication lacquer. Such a replication process makes it possible to produce surface structures with very sharp contours and of a great profile depth. Further advantages are that there is no thermal deformation of the web of film. In particular it is also possible in that way to produce rectangular profile shapes of high quality.

The printing station 36 has a printing roller, by means of which a printing substance of suitable viscosity is applied in pattern form in accordance with the surface pattern 13 and in accurate register relationship to the web of film which is provided with the microscopic surface structure 12.

The use of a central cylinder provides here that register accuracy of the application of the viscous printing substance to the microscopic surface structure 12 is further improved. In order to produce the high-resolution surface pattern 10, it is essential that the application of the printing substance in pattern form in accordance with the surface pattern 13 to the microscopic surface structure 12 takes place in accurate register relationship as otherwise the quality of the result falls and the desired level of resolution cannot be achieved.

Figure 4:
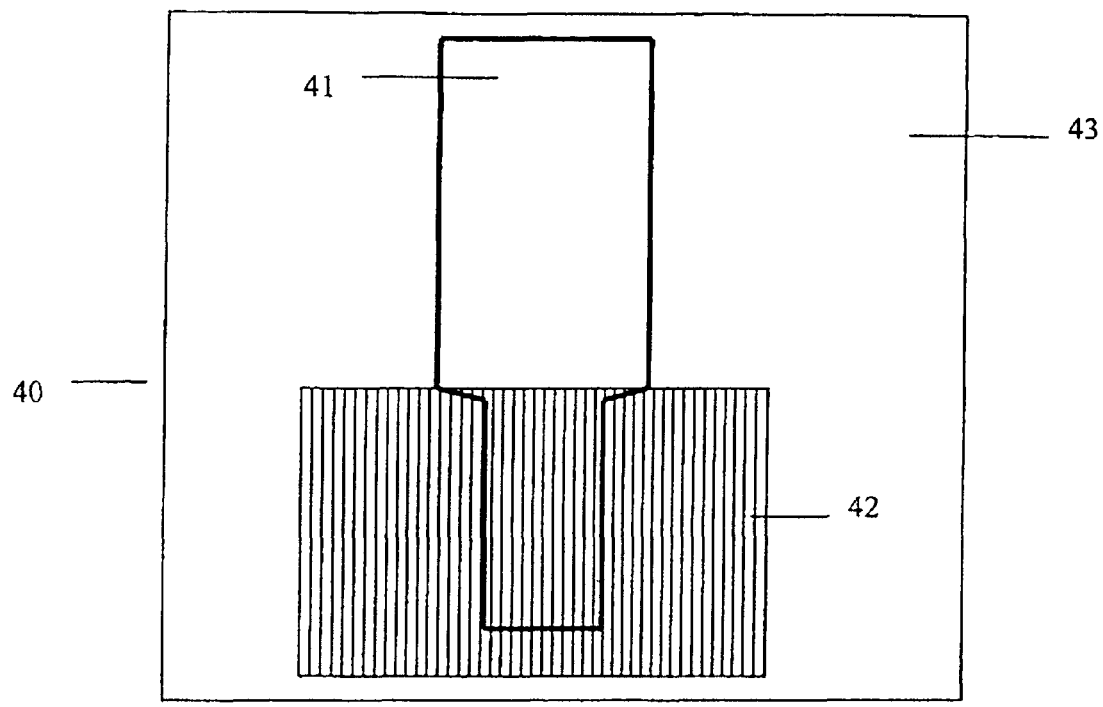
FIGS. 4a to 4c show various views of a multi-layer body according to the invention.
Figure 4:
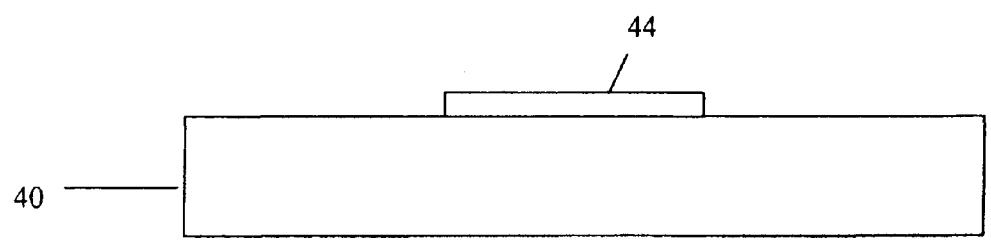
Figure 4:
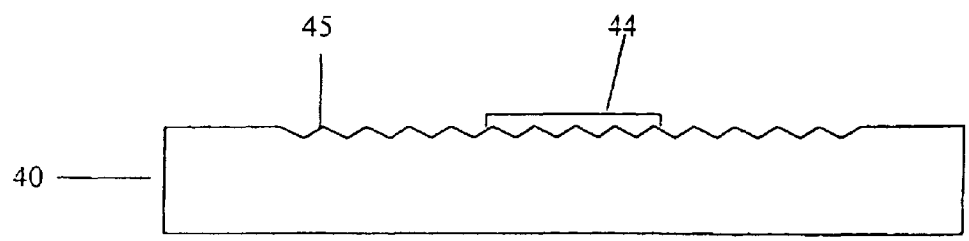

Reference will now be made to FIGS. 4a, 4b and 4c to describe by way of example the production of a surface region 41 of a high-resolution surface pattern.

FIGS. 4a, 4b and 4c show a substrate 40 with two surface regions 43 and 42. A microscopic surface structure 45 with a plurality of grooves is replicated in the surface region 42. The surface of the substrate 40 is smooth in the surface region 43, and does not have any microscopic groove structure.

A printing substance 44 is now applied in pattern form to the substrate 40, in the form of a rectangular line of constant thickness, using a printing process. In the surface region 42, the configurational shape of the applied printing substance is influenced by the local relief parameters of the microscopic surface structure 45. As illustrated in FIG. 4c, the orientation of the grooves of the microscopic surface structure 42 affords an asymmetrical configuration of the respectively applied, micro-fine amount of printing substance so that, in spite of the application using an equal thickness, the width of the surface region 41 is less in the region 42 (FIG. 4c) than in the region 41 (FIG. 4b).

Figure 5:
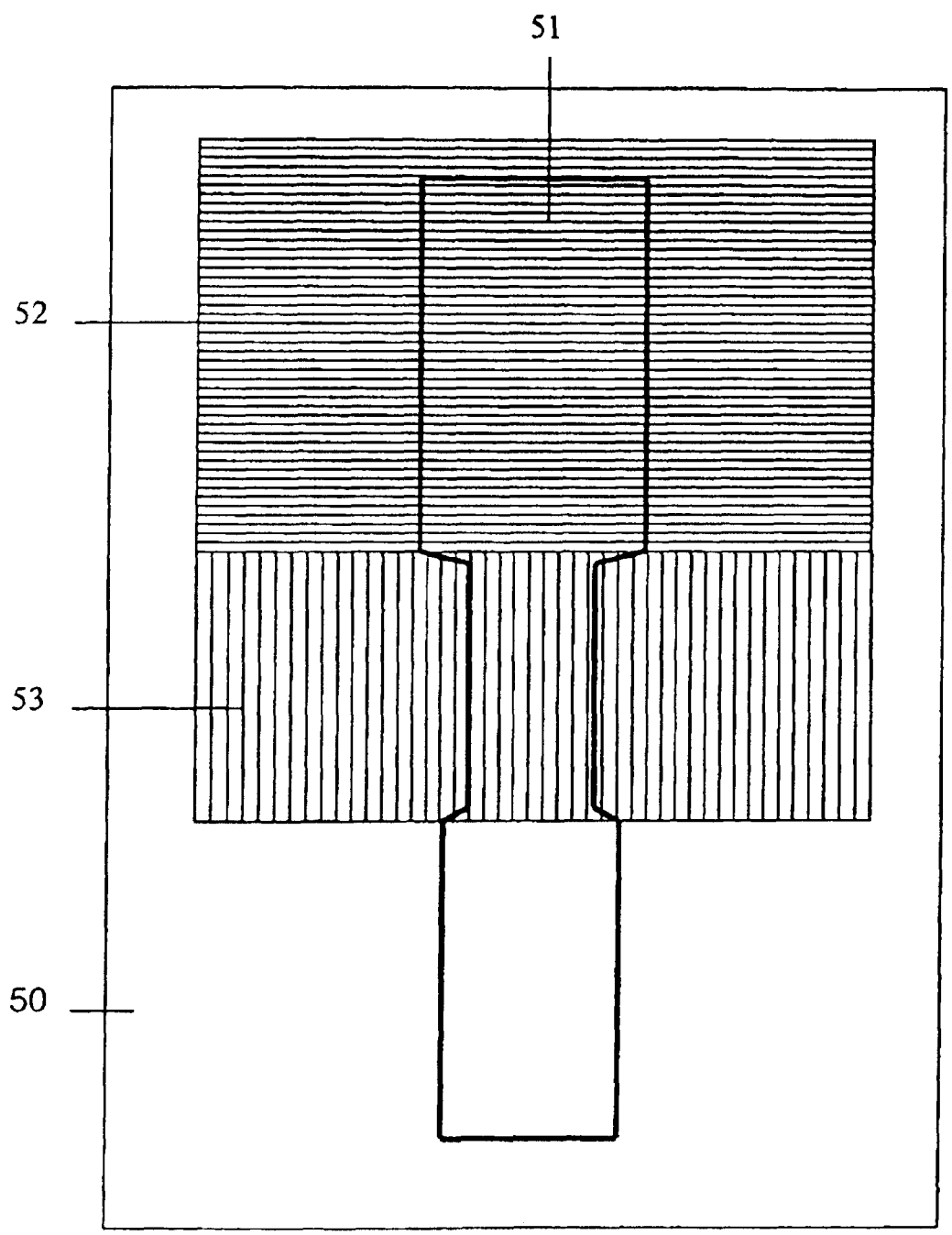
FIG. 5 shows a view of a multi-layer body according to the invention for a further embodiment of the invention.

FIG. 5 now shows a further embodiment of the invention in which fine structuring of the surface pattern is implemented by means of a variation in the orientation direction of the grooves of the microscopic surface structure.

FIG. 5 shows a substrate 50 having a plurality of regions 52, 53 and 54 in which, as diagrammatically shown in FIG. 5, the grooves of the microscopic surface structure are of different orientations.

A printing substance in the form of a rectangular line of constant width is now applied to the substrate 50. As shown in FIG. 5, a surface pattern 51 is produced therefrom in the shape shown in FIG. 5, due to the influence of the microscopic surface structure.

The width of a surface region of the surface pattern 51 is thus determined substantially by the choice of the angle between the longitudinal axis of the surface region and the orientation direction of the associated part of the microscopic surface structure.

In the region 52, a sine grating with a spatial frequency of 100 L/mm and a profile depth of 400 nm is shaped into the surface of the substrate 50, the orientation direction of the grooves of the sine grating being turned through 90 degrees with respect to the longitudinal axis of the line-shaped application of printing substance. In the region 53, a sine grating involving a spatial frequency of 100 L/mm and a profile depth of 400 nm is shaped in the surface of the substrate 50, the orientation direction of the grooves of the sine grating corresponding to the longitudinal axis of the line-shaped application of printing substance. The surface is unstructured in the region 54.

As shown in FIG. 5 the width of the surface regions of the surface pattern 51 is determined substantially by the angle between the longitudinal axis of the surface region and the orientation direction of the associated portion of the microscopic surface structure. If, as in the region 52, the orientation direction of the grating and the longitudinal axis of the surface region are turned relative to each other through 90 degrees, then the width of the surface region is increased by about 15 percent in comparison with the unstructured surface. If the orientation direction of the surface structure and the longitudinal axis of the surface region are the same, there is a reduction in the width of the surface region by about 15 percent in comparison with the unstructured surface.

Particularly good results in carrying the above-described procedure into effect can be achieved if sine gratings with a spatial frequency of 100 to 600 L/mm and a profile depth of 400 nm to 1200 nm are used as surface structures, in conjunction with a printing substance involving a viscosity of 100 mPas.

FIGS. 6 to 9 now show a number of embodiments of further microscopic surface structures, by means of which it is possible to produce a high-resolution surface pattern in accordance with the process of the invention.

Figure 6:
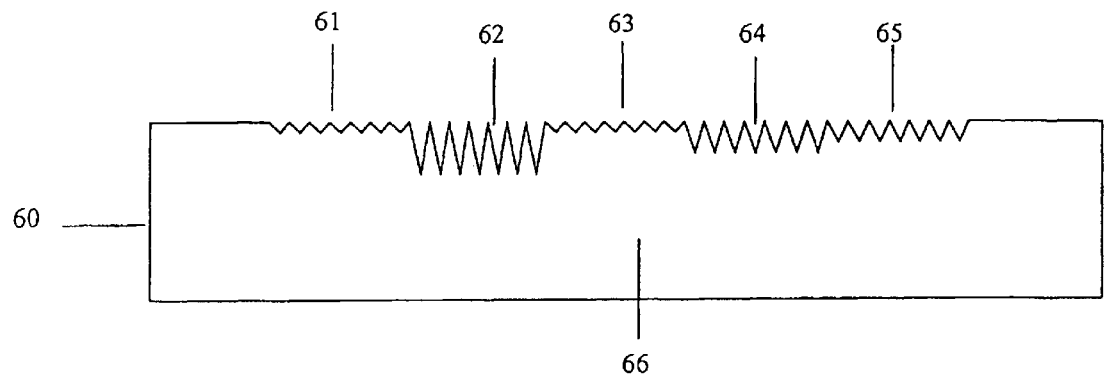
FIG. 6 shows a view in section through a multi-layer body.

FIG. 6 shows a substrate 60, in the surface of which a microscopic surface structure 66 is replicated. As shown in FIG. 6 the profile depth of the microscopic surface structure 66 varies in the regions 61, 62, 63, 64 and 65. Thus, in the region of the surface structure 66, the fine structuring of a surface pattern is not only influenced, as described with reference to FIG. 5, by the variation in the orientation direction of the grooves of the microscopic surface structure 66, but also by the variation in the profile depth of the microscopic surface structure. Thus for example an increase in the profile depth makes it possible to reduce the proportion of the surface area of the substrate, which is wetted by a micro-fine printing substance drop. Thus it is advantageous for example to provide a greater profile depth in the region 53 than in the region 52.

Figure 7:
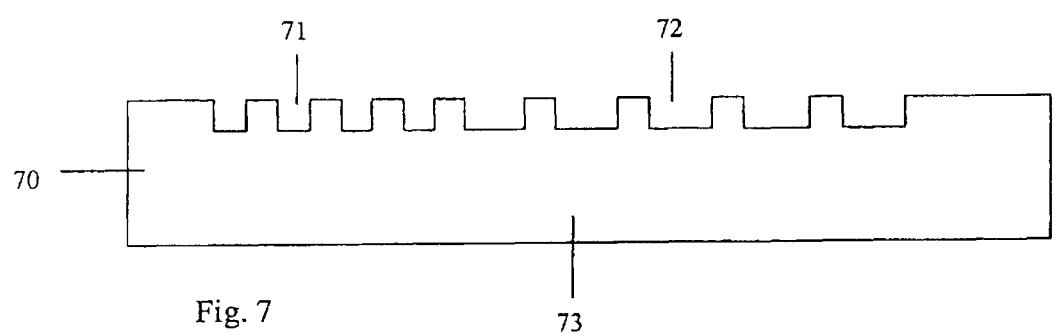
FIG. 7 shows a further view in section through a multi-layer body.

FIG. 7 shows a substrate 70, in the surface of which a microscopic surface structure 73 is replicated. As shown in FIG. 7, the pulse duty cycle of recessed portions to raised portions of the relief structure is different in the respective regions 71 and 72. That provides that the volume of the recessed portions is greater in the region 72 than in the region 71, whereby it is possible to achieve an effect similar to the effect of increasing the profile depth.

Figure 8:
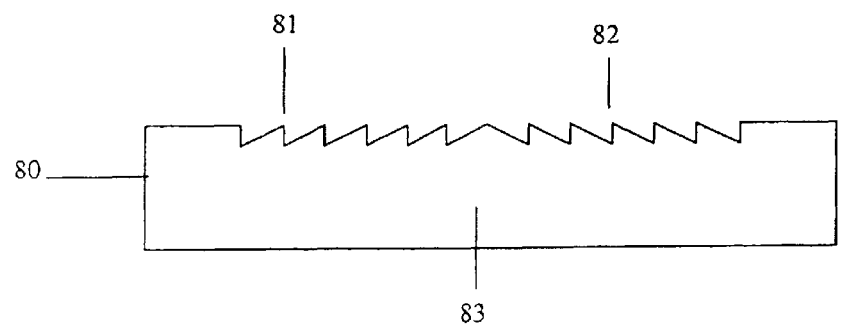
FIG. 8 shows a further view in section through a multi-layer body.

FIG. 8 shows a substrate 80, in the surface of which a microscopic surface structure 83 is replicated. That asymmetrical surface structure is a sawtooth grating. A sawtooth grating of that kind achieves the effect that centering of the printing substrate application applied to that surface structure is altered. Thus for example in the region 81 centering of the printing substrate application is displaced somewhat towards the left while in the region 82 centering of the ink application applied to that region is displaced somewhat towards the right. Ultimately that provides for an increase in the distance between surface regions of the surface pattern in the regions 81 and 82.

Reference will be made hereinafter to FIGS. 9a to 9c to describe a number of embodiments of the invention, in which the effects described with reference to FIGS. 5 to 8 are used.

FIG. 9a shows a substrate 90 and a high-resolution surface pattern 93 produced on the substrate 90. Different microscopic surface structures are shaped in the surface of the substrate 90, in the regions 91 and 92. Thus shaped in the region 92 is a microscopic surface structure whose grooves are oriented in a direction 99, which involves a spatial frequency preferably in the region of 100 L/mm and whose profile depth is in the region of 600 nm. Shaped in the region 91 is a microscopic surface structure whose grooves are turned through 90 degrees with respect to the grooves of the surface structure in the region 92, whose spatial frequency is preferably in the region of 100 L/mm and which preferably has a profile depth of 600 nm.

A printing substance is now applied to the substrate 90, in the form of two parallel lines oriented in the direction 99. The relief parameters of the microscopic surface structure in the regions 91 and 92 provide that, in the region 91, the surface pattern 99 shapes a surface region over the full surface area involved, and in the region 92, the surface pattern 93 shapes two thin limbs which are spaced at a small spacing (see FIG. 9a). It is advantageous in that respect that it is possible to achieve a very small spacing between the limbs of the surface region 92. Thus, that spacing can be for example 30 μm or less.

FIG. 9b shows the substrate 90 and a high-resolution surface pattern 95 produced on the substrate 90. In the regions 93 and 94 microscopic surface structures with different relief parameters are shaped in the surface of the substrate 90. Shaped in the region 93 is a microscopic surface structure whose grooves are oriented in the direction 99 and which involves a symmetrical relief profile with a spatial frequency in the range of 100 to 600 L/mm and a profile depth in the range of 400 to 1100 nm. Shaped in the region 94 is a microscopic surface structure whose orientation direction is the same as that of the surface structure in the region 93, but which, in contrast to the surface structure in the region 93, involves an asymmetrical profile shape, for example as described with reference to FIG. 8.

If now printing substance is applied to the surface regions 93 and 94 in the form of a thin line oriented in the longitudinal direction of the substrate, that affords the effect, shown in FIG. 9b, of an asymmetrical reduction in width of the surface pattern produced, in the region 94.

As shown in FIG. 9c, that region can be utilised to produce two lines which are very close together.

FIG. 9c thus shows the substrate 90 on which a high-resolution surface pattern 98 is produced. In the region 96 the microscopic surface structure of the region 93 is shaped in the substrate 90, as shown in FIG. 9b. In the region 97, as in the region 94 shown in FIG. 9b, a surface structure with an asymmetrical relief profile is shaped therein. In this respect, in the right-hand portion of the region 97, the asymmetrical profile is oriented as in the region 82 shown in FIG. 8 while in the left-hand portion of the region 97 it is oriented as in the region 81 shown in FIG. 8.

When now a printing substance is applied in the form of two thin, mutually parallel lines to the regions 96 and 97, the surface pattern 98 shown in FIG. 9c is generated.

Such a procedure makes it possible to produce limbs in the region 97, which are only at a spacing of 25 μm from each other.

Various high-resolution surface patterns can be produced by a combination of the procedures depicted in FIGS. 5 to 9c. Thus the above-discussed interrelationships are coded for example in the computing device 11 so that, in relation to a predetermined, pre-defined high-resolution surface pattern, the configuration required for that purpose in respect of the microscopic surface structure and the associated surface pattern in which the application of printing substance to be effected can be calculated.

Figure 10:
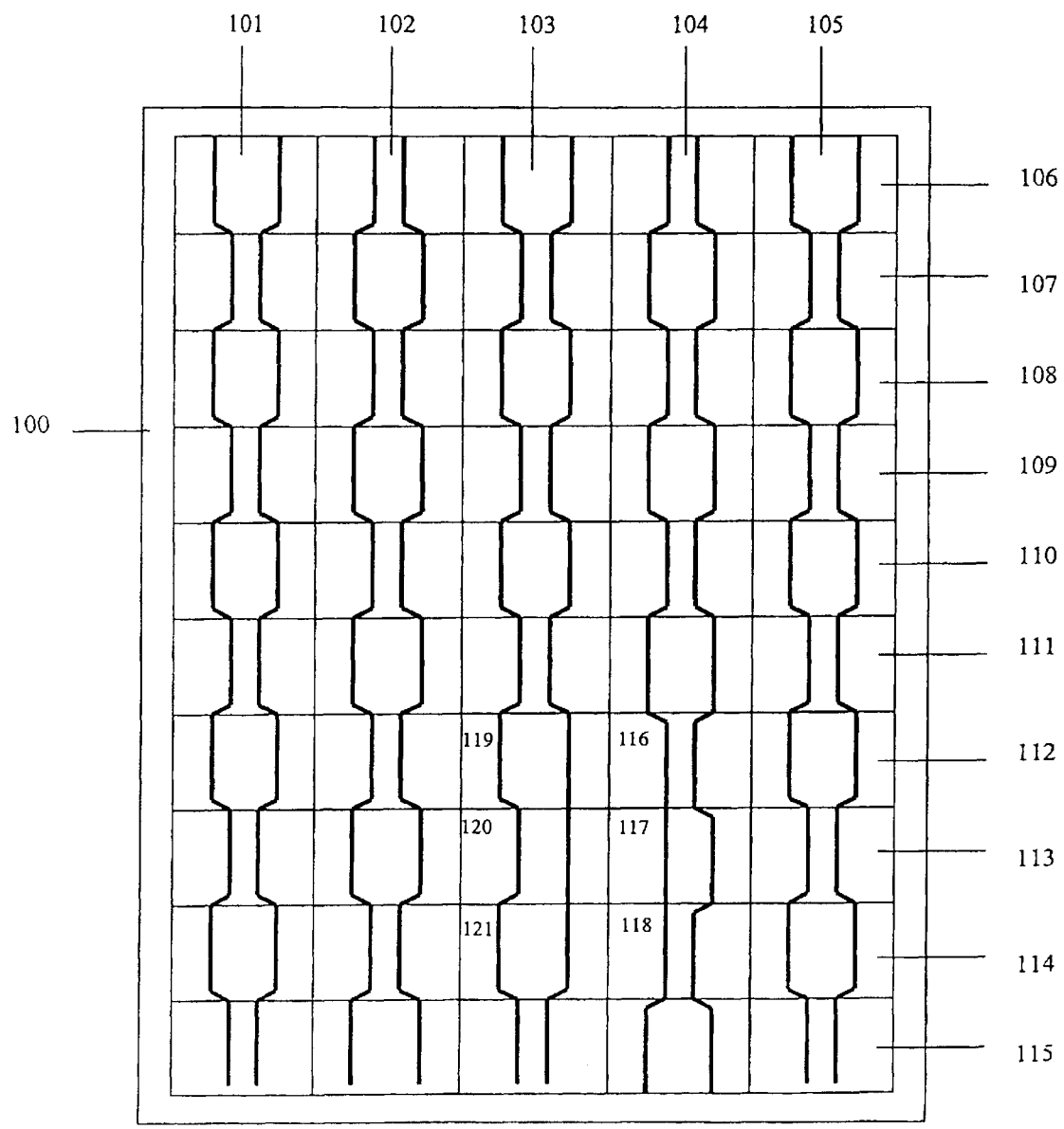
FIG. 10 shows a multi-layer body according to the invention with a moiré pattern for a further embodiment of the invention.

FIG. 10 now shows a preferred embodiment of a surface pattern which can be generated with the invention. FIG. 10 shows a substrate 100 on which is produced a surface pattern having a plurality of mutually parallel surface regions 101 to 105. Shaped on the surface of the substrate 100 is a microscopic surface structure which is composed of a plurality of partial structures arranged in a chessboard-like manner. In each of the partial structures, the relief parameters differ from the relief parameters of the surrounding partial structures.

Thus for example FIG. 10 shows a plurality of partial structures 106 to 115. The partial structures 106, 108, 110, 112 and 114 are formed by a microscopic structure, as is provided in the region 52 shown in FIG. 5. The partial structures 107, 109, 111, 113 and 115 are each formed by a respective microscopic structure, as is provided in the region 52 shown in FIG. 5. By virtue of that configuration, when a printing substrate is applied in the form of a thin line to the regions of the partial structures 106 to 115, the result is a line which varies in its thickness, as is shown in FIG. 10 in the surface regions 101, 102 and 105 of the surface pattern.

Now, by a modification to the surface structure of partial structures, it is possible to interrupt the regularity of the pattern but in so doing to keep constant the average impression which can be resolved for the human eye (average coverage area by printing substrate).

This is shown in FIG. 10 by way of example, on the basis of a variation in the structures 117 and 120: the partial structures 119, 116, 121 and 118 of the microscopic surface structure are still in accordance with the above-discussed layout. The partial structures 120 and 117 each have two portions in which the orientation of the grooves are displaced relative to each other through 90 degrees. That provides that the line thickness is reduced in the left-hand portion of the partial structure 117 and the line thickness is increased in the right-hand portion of the partial structure 120. The coverage area thus remains on average equal, but the variation in the microstructure can be recognised as a moiré pattern by means of a suitable evaluation device, and can be evaluated as additional information.

Figure 11:
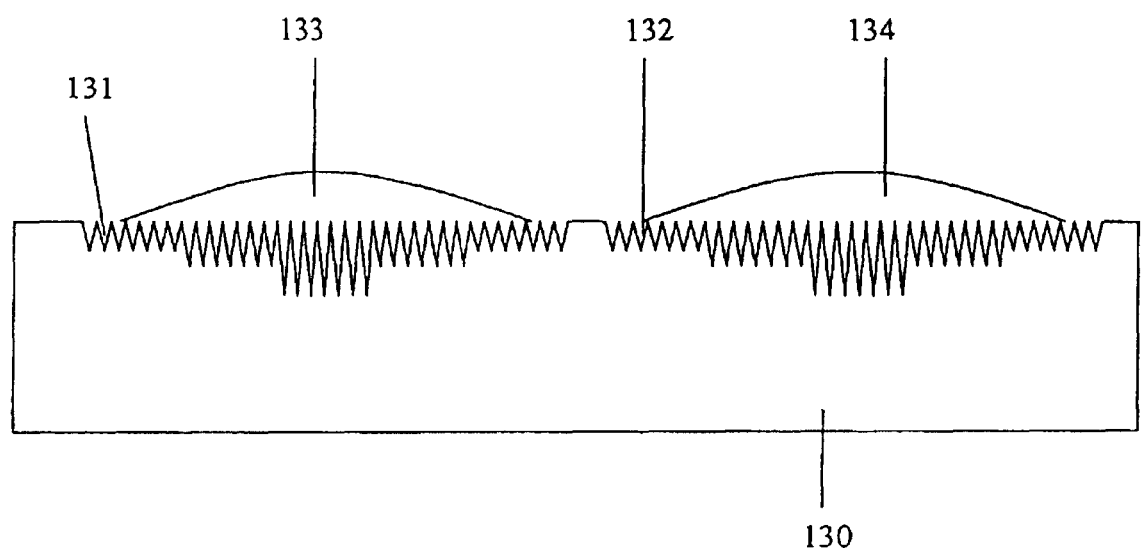
FIG. 11 shows a section through a multi-layer body according to the invention for a further embodiment of the invention.

FIG. 11 now shows a possible way of varying the thickness of the printing substance layer in a pre-defined manner, by means of the above-discussed procedures.

FIG. 11 shows a substrate 130 in which a microscopic surface structure is replicated. The profile depth of the surface structure now varies in the regions 131 and 132 of the microscopic surface structure. As shown in FIG. 11, the profile depth is at the greatest at the centre of the regions 131 and 132 and decreases towards the boundary lines of the regions 131 and 132.

If now a high-refractive lacquer is applied as the printing substance to the regions 131 and 132, the layer thickness of the applied printing substrate follows the profile depth of the microscopic surface structure. Accordingly, the application of the high-refractive printing substance to the surface regions 131 and 132 produces lens bodies 133 and 134 which have convex or concave properties, in accordance with the predetermined profile depth profile of the microscopic surface structure.

The invention claimed is:

1. A process for producing a high-resolution surface pattern on a substrate, comprising the steps of:
   providing a desired surface pattern, said desired surface pattern having a line width;
   based upon said desired surface pattern, generating:
      a specification of a microscopic surface structure consisting of a plurality of grooves, said grooves having an orientation direction, a profile shape, a spatial frequency of more than 50 grooves/mm, and a profile depth of less than 2 μm; and
      an associated surface pattern;
   such that, when, in accordance with the associated surface pattern, a printing substance is applied to a substrate having the microscopic surface structure, the printing substance forms the desired surface pattern;
   forming in the substrate a microscopic surface structure corresponding to the generated specification of a microscopic surface structure; and
   by means of a printing process, applying an amount of a printing substance to the substrate in pattern form according to the generated associated surface pattern to produce the desired surface pattern on the substrate.

2. A process according to claim 1, wherein the line width of the printed surface pattern is varied by variations in the orientation direction of the grooves of the microscopic surface structure.

3. A process according to claim 1, wherein the line width of the printed surface pattern is varied by variations in the profile depth of the grooves of the microscopic surface structure.

4. A process according to claim 1, wherein the line width of the surface pattern is varied by variations in the profile shape of the grooves of the microscopic surface structure.

5. A process according to claim 1, wherein the amount of printing substance is applied to the substrate along a line having a longitudinal axis perpendicular to the line width, whereby the line width of the surface pattern is determined by the choice of the angle between the longitudinal axis of the applied line of printing substance and the orientation direction of the grooves of the microscopic surface structure.

6. A process according to claim 1, wherein the width of a surface region of the surface pattern is varied by the provision, in the surface region, of regions with a different orientation direction for the surface structure.

7. A process according to claim 6, wherein the width of the surface region of the surface pattern is varied by the provision, in the surface region, of at least two regions with the orientation directions of the surface structure being rotated relative to each other through 90 degrees.

8. A process according to claim 1, wherein the width of the surface region of the surface pattern is varied by the provision, in the surface region, of regions with a different profile shape and/or profile depth of the surface structure.

9. A process according to claim 1, wherein the grooves of the microscopic surface structure have an asymmetrical profile shape.

10. A process according to claim 5, wherein the line width of the surface pattern in at least one microscopic surface structure region is less than 50 μm.

11. A process according to claim 1, wherein the grooves of the microscopic surface structure form moirépatterns.

12. A process according to claim 1, wherein the grooves of the microscopic surface structure form a micro-script pattern.

13. A process according to claim 1, wherein the amount of printing substance applied is defined by a layer thickness, the thickness of the printing substance layer varying in a predefined manner by varying the profile depth of the grooves of the microscopic surface structure.

14. A process according to claim 13, wherein a high-refractive lacquer is used as the printing substance and that a lens body is produced by the variation in the profile depth of the grooves in the region.

15. A process according to claim 1, wherein the line width of the surface pattern is varied by a variation in the relief parameters of the microscopic surface structure with a substantially constant application amount of printing substance per unit of surface area.

16. A process according to claim 1, wherein the microscopic surface structure has a spatial frequency of from 100 to 1200 grooves/mm, and a profile depth of from 0.2 to 1.0 μm.

* * * * *